(12) United States Patent
Li

(10) Patent No.: US 12,420,981 B2
(45) Date of Patent: Sep. 23, 2025

(54) ASSEMBLED PLASTIC PALLET

(71) Applicant: GUANGDONG HANDSOME TECHNOLOGY LIMITED, Guangzhou (CN)

(72) Inventor: Wujun Li, Guangzhou (CN)

(73) Assignee: GUANGDONG HANDSOME TECHNOLOGY LIMITED, Guangzhou (CN)

( * ) Notice: Subject to any disclaimer, the term of this patent is extended or adjusted under 35 U.S.C. 154(b) by 326 days.

(21) Appl. No.: 18/168,264

(22) Filed: Feb. 13, 2023

(65) Prior Publication Data

US 2023/0192358 A1    Jun. 22, 2023

Related U.S. Application Data

(63) Continuation of application No. PCT/CN2022/117780, filed on Sep. 8, 2022.

(30) Foreign Application Priority Data

Sep. 10, 2021  (CN) .......................... 202111063412.6

(51) Int. Cl.
*B65D 19/00* (2006.01)
*B65D 19/38* (2006.01)

(52) U.S. Cl.
CPC ....... *B65D 19/0051* (2013.01); *B65D 19/385* (2013.01); *B65D 2519/00024* (2013.01); *B65D 2519/00034* (2013.01); *B65D 2519/00069* (2013.01); *B65D 2519/00273* (2013.01); *B65D 2519/00308* (2013.01); *B65D 2519/00323* (2013.01); *B65D 2519/00338* (2013.01); *B65D 2519/00407* (2013.01); *B65D 2519/00412* (2013.01); *B65D 2519/00835* (2013.01); *B65D 2519/0096* (2013.01)

(58) Field of Classification Search
CPC ...... B65D 19/0051; B65D 2519/00024; B65D 2519/00034; B65D 2519/00069; B65D 2519/00273; B65D 2519/00308; B65D 2519/00323; B65D 2519/00407; B65D 2519/00412; B65D 2519/00835; B65D 2519/0096
USPC .......................... 108/57.25, 55.1, 55.3, 55.5
See application file for complete search history.

(56) References Cited

U.S. PATENT DOCUMENTS

| | | | |
|---|---|---|---|
| 4,843,976 A * | 7/1989 | Pigott ................ | B65D 19/0012 24/453 |
| 5,197,395 A * | 3/1993 | Pigott ................ | B65D 19/0012 108/56.1 |

(Continued)

*Primary Examiner* — Daniel J Troy
*Assistant Examiner* — Timothy M Ayres
(74) *Attorney, Agent, or Firm* — Muncy, Geissler, Olds & Lowe, P.C.

(57) ABSTRACT

An assembled plastic pallet is provided in the disclosure, which includes a panel and a plurality of support legs detachably arranged at a lower side of the panel. A metal reinforcement is embedded in the panel, each of the plurality of support legs is in a cuboid, four sides of each of the plurality of support legs is recessed inward to form a first groove, four sides of each of the plurality of support legs is formed with a reinforcing rib, and the reinforcing rib is smoothly transitioned to a bottom of the first groove with an arc. An assembled plastic pallet provided in this disclosure can be freely assembled as required and has high bearing capacity.

8 Claims, 10 Drawing Sheets

(56) References Cited

U.S. PATENT DOCUMENTS

| | | | | |
|---|---|---|---|---|
| 5,579,686 A | * | 12/1996 | Pigott | B65D 19/0012 108/56.1 |
| 5,918,551 A | * | 7/1999 | Liu | B65D 19/10 108/55.3 |
| 6,006,677 A | * | 12/1999 | Apps | B65D 19/0012 108/57.33 |
| 6,021,721 A | * | 2/2000 | Rushton | B65D 19/0081 108/56.1 |
| 6,237,509 B1 | * | 5/2001 | Ishido | B65D 19/38 108/57.29 |
| 7,661,373 B2 | * | 2/2010 | Apps | B65D 19/0012 108/57.1 |
| 7,748,329 B2 | * | 7/2010 | Baltz | B65D 19/0048 108/57.25 |
| 7,779,765 B2 | * | 8/2010 | Donnell, Jr. | B65D 19/0016 108/56.1 |
| 8,127,691 B2 | * | 3/2012 | Ingham | B29C 66/114 108/57.25 |
| 8,291,839 B2 | * | 10/2012 | Apps | B65D 19/004 108/57.25 |
| 10,081,453 B2 | * | 9/2018 | Storteboom | B65D 19/0073 |
| 10,081,454 B2 | * | 9/2018 | Storteboom | B65D 19/0012 |
| 10,093,448 B2 | * | 10/2018 | Storteboom | B65D 19/38 |
| 10,562,666 B2 | * | 2/2020 | D'Emidio | B65D 19/0016 |
| 11,104,479 B2 | * | 8/2021 | Daubenspeck | B65D 19/42 |
| 11,352,169 B2 | * | 6/2022 | Apps | B65D 19/0038 |
| 11,420,791 B2 | * | 8/2022 | Sostmann | B65D 19/0016 |
| 11,584,563 B2 | * | 2/2023 | Sostmann | B65D 19/0026 |
| 11,787,598 B2 | * | 10/2023 | D'Emidio | H04L 67/63 108/57.25 |
| 2006/0278138 A1 | * | 12/2006 | Chi | B65D 19/0028 108/57.25 |
| 2014/0261102 A1 | * | 9/2014 | Kuo | B65D 19/44 108/55.3 |
| 2016/0039566 A1 | * | 2/2016 | Lorenz | B65D 19/0006 108/57.25 |

* cited by examiner

ASSEMBLED PLASTIC PALLET

CROSS REFERENCE TO RELATED APPLICATIONS

This application is a bypass continuation of co-pending International Application No. PCT/CN2022/117780, filed on Sep. 8, 2022, claims priority of application No. 202111063412.6 filed in China on Sep. 10, 2021, the entire contents of all of which are hereby incorporated by reference.

TECHNICAL FIELD

The disclosure relates to the technical field of warehousing and logistics equipment, in particular to an assembled plastic pallet.

BACKGROUND ART

A Pallet is a base made to facilitate placement and delivery of scattered goods, which can be placed on the ground to prevent the goods from being wet or damaged, also can be used as a logistics unit matched with logistics equipment such as forklifts and shelves to facilitate loading, unloading and handling of the goods, and is one of essential logistics equipment in modern logistics and warehousing. At present, commonly used pallets mainly include wooden pallets and plastic pallets, among which the plastic pallets are widely used due to their light weight, corrosion resistance and long service life and the like. However, the plastic pallets are usually integrally molded by injection molding, which requires a large machine to produce. Moreover, various types of pallets need to be made with multiple sets of large molds. In addition, the plastic pallets are mostly made of plastic, which is easy to deform, with less high bearing capacity; and if a pallet foot is partially damaged, the whole pallet can't be used properly, which reduces service life and makes production cost higher.

SUMMARY

Aiming at above problems, an assembled plastic pallet is provided in this disclosure which can be freely assembled as required and has high bearing capacity.

Technical schemes adopted by the disclosure are as follows: an assembled plastic pallet is provided in the disclosure, which includes a panel and a plurality of support legs detachably arranged at a lower side of the panel. A metal reinforcement is embedded in the panel, each of the plurality of support legs is in a cuboid, four sides of each of the plurality of support legs is recessed inward to form a first groove, four sides of each of the plurality of support legs is formed with a reinforcing rib, and the reinforcing rib is smoothly transitioned to a bottom of the first groove with an arc.

Optionally, an edge of an upper side of the panel is provided with a plurality of stoppers, and each of the plurality of stoppers is arranged corresponding to the first groove.

Optionally, the upper side of the panel is also provided with a plurality of antiskid blocks which are provided with an antiskid ridge.

Optionally, the stopper and the panel are detachably connected with each other through a first clamping structure. The first clamping structure includes a first clamping slot, a first clamping leg and a second clamping leg. The first clamping leg and the second clamping leg are spaced apart from each other, and directions of the first clamping leg and the second clamping leg are disposed to be directed opposite to each other, and the first clamping leg and the second clamping leg extend into the first clamping slot to be matched and clamped.

Optionally, the panel and the support leg are detachably connected with each other through a second clamping structure. The second clamping structure includes a third clamping leg, a clamping post and a second clamping slot. The third clamping leg is provided with a clamping step and a clamping head, and the clamping step is matched with the clamping post for limiting. The clamping head has a clamping slope, and a part of the clamping head is inserted into the second clamping slot.

Optionally, the assembled plastic pallet further includes a plurality of bottom deckboards. The plurality of support legs are arranged in rows along a first horizontal direction and a second horizontal direction, and the plurality of bottom deckboards are detachably arranged at a bottom of the support legs along the first horizontal direction and/or the second horizontal direction.

Optionally, a metal reinforcement is embedded in the plurality of bottom deckboards so as to increase structural strength of the plurality of bottom deckboards, so that structures of the bottom deckboards are firm when being put on a shelf. The metal reinforcement in the plurality of bottom deckboards may be a steel tube, and it may also be of the same construction as the metal reinforcement in the panel.

Optionally, the bottom of the support leg is provided with a clamping column with a circular cross section. The clamping column is provided with a plurality of fourth clamping legs distributed along its circumferential direction, each of the plurality of bottom deckboards is provided with a plurality of clamping slots corresponding to the fourth clamping legs, and the fourth clamping legs are matched and clamped with the clamping slots.

Optionally, the metal reinforcement includes a tubular metal reinforcement tube and a support embedded in the metal reinforcement tube, and a side of the support abuts against an inner wall of the metal reinforcement tube.

Optionally, a cross section of the metal reinforcement tube is rectangular, and the support includes at least one first support part and at least one second support part. The first support part and the second support part are arranged perpendicular to each other.

Optionally, the metal reinforcement tube is sleeved with a plurality of positioning fasteners, and an outer side surface of each of the positioning fasteners protrudes outwards to form a positioning part.

Optionally, a stress relief area is provided on the panel and/or at an edge of the panel. The stress relief area can be a circle hole or an arc groove, which can prevent stress concentration of the panel after injection molding.

Specifically, the edge of the panel is provided with arc grooves, and a number of the arc grooves can be even, and an even number of arc grooves are symmetrically arranged at the edge of the panel, so that stress concentration can be uniformly reduced and uneven deformation of the panel can be avoided. The arc groove is in a circular arc or elliptical arc shape, and the arc groove can also be a combined structure of an arc and a circle hole. The panel is provided with a circle hole, which can be circular or oval. A hole opening position should be specifically selected according to a stress direction and position of the panel. Generally, the round hole should be opened in a low-stress area. If it must be opened in a high-stress area, the oval hole should be adopted with a major axis of the oval hole being parallel to a principal stress direction, which can effectively reduce stress concentration coefficient.

The disclosure has following beneficial effects: in the assembled plastic pallet according to this disclosure, a detachable structure is arranged between the panel and the support leg, so that the support leg and the panel can be assembled as desired, which can meet different storage requirements; and when the support leg is damaged, only the support leg need to be replaced and no replacing of the whole plastic pallet is needed, thus saving resource and maintenance cost. Respective parts of the plastic pallet can be manufactured separately. When different types of pallets need to be produced, only one or several of molds is adjusted, with higher versatility of injection molding equipment and molds, which can effectively reduce production cost. The metal reinforcement is embedded in the panel, which can effectively enhance structural strength of the panel and guarantee service life of the panel. In addition, since the metal reinforcement is embedded in the panel during injection molding, a problem of oxidation corrosion of the metal reinforcement can be effectively avoided. The side of the support leg is provided with a first groove inward, and the side of the support leg protrudes outward to form the reinforcing rib, that is, the side of the support leg has a tortuous structure, with high structural strength and more stable supporting structure of the support leg.

Figure 1:
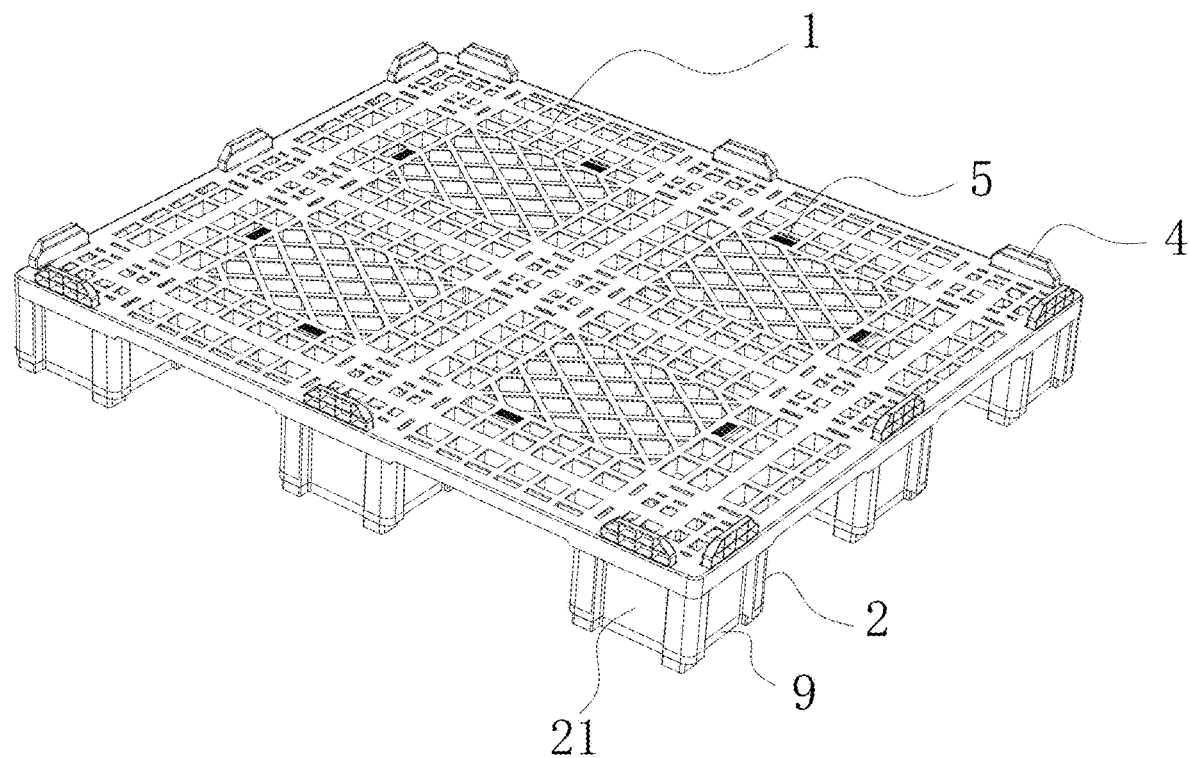
FIG. 1 is a schematic structural diagram according to a first embodiment of the present disclosure.

Reference numbers in the figures are as follows: 1. Panel; 2. Support Leg; 3. Metal Reinforcement; 4. Stopper; 5. Antiskid Block; 6. First Clamping Structure; 7. Second Clamping Structure; 8, Bottom Deckboard; 9. Baseboard; 51. Antislip Ridge; 41. Introducing Slope; 21. First Groove; 22. Reinforcing Rib; 23, Clamping Column; 61. First Clamping Slot; 62. First Clamping Leg; 63. Second Clamping Leg; 71. Third Clamping Leg; 72. Clamping Post; 73. Second Clamping Slot; 711. Clamping Step; 712. Clamping Head; 713. Clamping Slope; 714. Reinforcing Bar; 231, Fourth Clamping Leg; 81. Clamping Slot; 11. Positioning Cylinder; 31. Metal Reinforcement Tube; 32. Support; 321. First Support Part; 322. Second Support Part; 33. Positioning Fastener; 331. Positioning Part; 332. Fractured Groove; 12. Circle Hole; 13. Arc Groove; 91. Mounting Hole; X represents a first horizontal direction; and Y represents a second horizontal direction.

DETAILED DESCRIPTION

In the following, a detailed and complete description of the present disclosure will be made in combination with specific embodiments with reference to the drawings.

As shown in FIGS. 1 to 13, an assembled plastic pallet is provided in the disclosure, which includes a panel 1 and a plurality of support legs 2 detachably arranged at a lower side of the panel 1. A metal reinforcement 3 is embedded in the panel 1, each of the plurality of support legs 2 is in a cuboid, four sides of each of the plurality of support legs 2 is recessed inward to form a first groove 21, four sides of each of the plurality of support legs 2 is formed with a reinforcing rib 22, and the reinforcing rib 22 is smoothly transitioned to a bottom of the first groove 21 with an arc 21a.

A detachable structure is arranged between the panel 1 and the support leg 2, so that the support leg 2 and the panel 1 can be assembled as desired, which can meet different storage requirements; and when the support leg 2 is damaged, only the support leg 2 need to be replaced and no replacing of the whole plastic pallet is needed, thus saving resource and maintenance cost. Respective parts of the plastic pallet can be manufactured separately. When different types of pallets need to be produced, only one or several of molds is adjusted, with higher versatility of injection molding equipment and molds, which can effectively reduce production cost. The metal reinforcement 3 is embedded in the panel 1, which can effectively enhance structural strength of the panel 1 and guarantee service life of the panel 1. In addition, since the metal reinforcement 3 is embedded in the panel 1 during injection molding, a problem of oxidation corrosion of the metal reinforcement 3 can be effectively avoided. The side of the support leg 2 is provided with a first groove 21 inward, and the side of the support leg 2 protrudes outward to form the reinforcing rib 22, that is, the side of the support leg 2 has a tortuous structure, with high structural strength and more stable supporting structure of the support leg 2.

Figure 3:
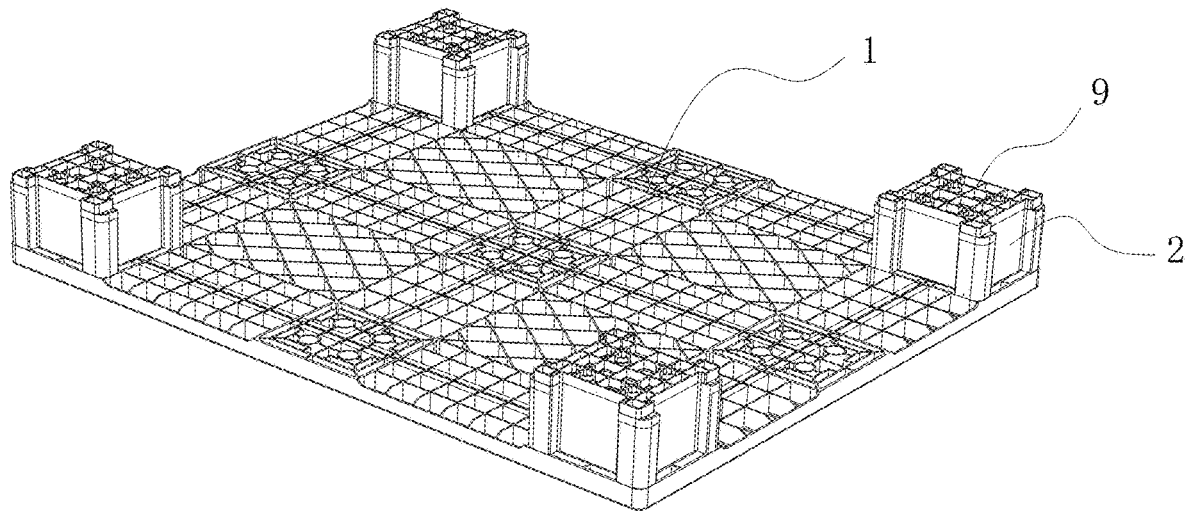
FIG. 3 is a schematic diagram of a bottom structure according to a second embodiment of the present disclosure.
Figure 4:
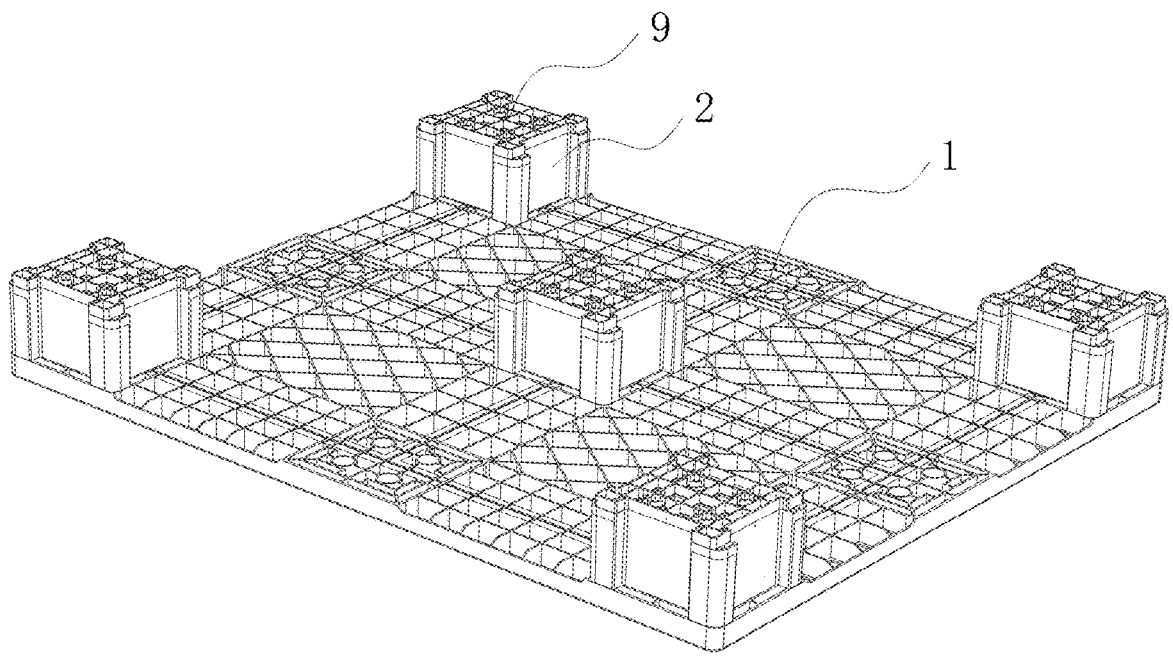
FIG. 4 is a schematic diagram of a bottom structure according to a third embodiment of the present disclosure.
Figure 5:
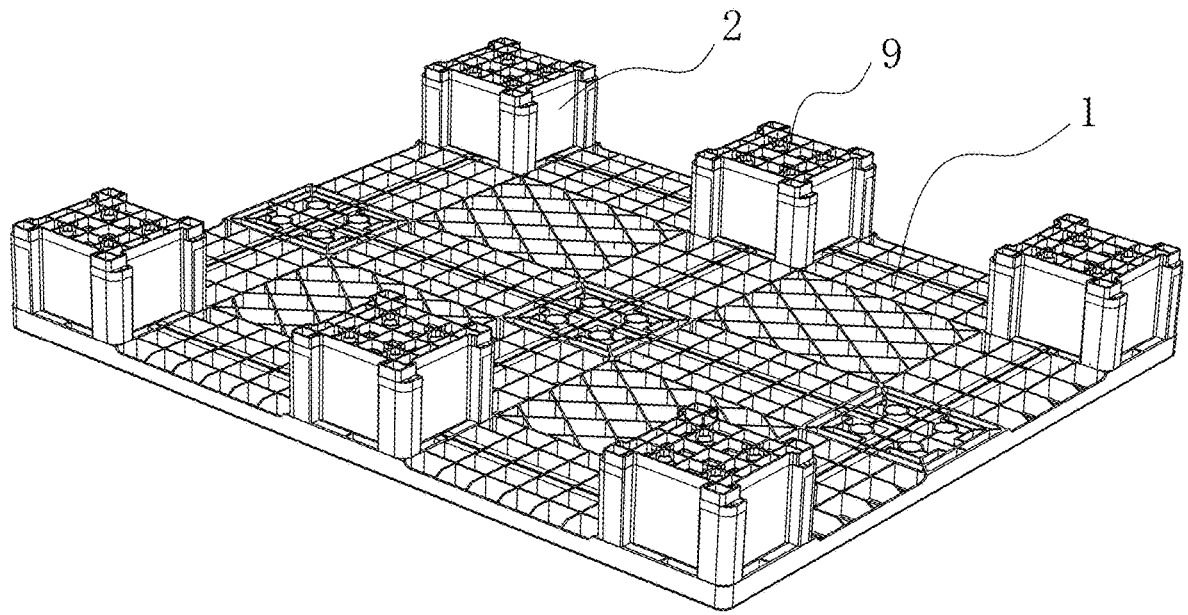
FIG. 5 is a schematic diagram of a bottom structure according to a forth embodiment of the present disclosure.
Figure 6:
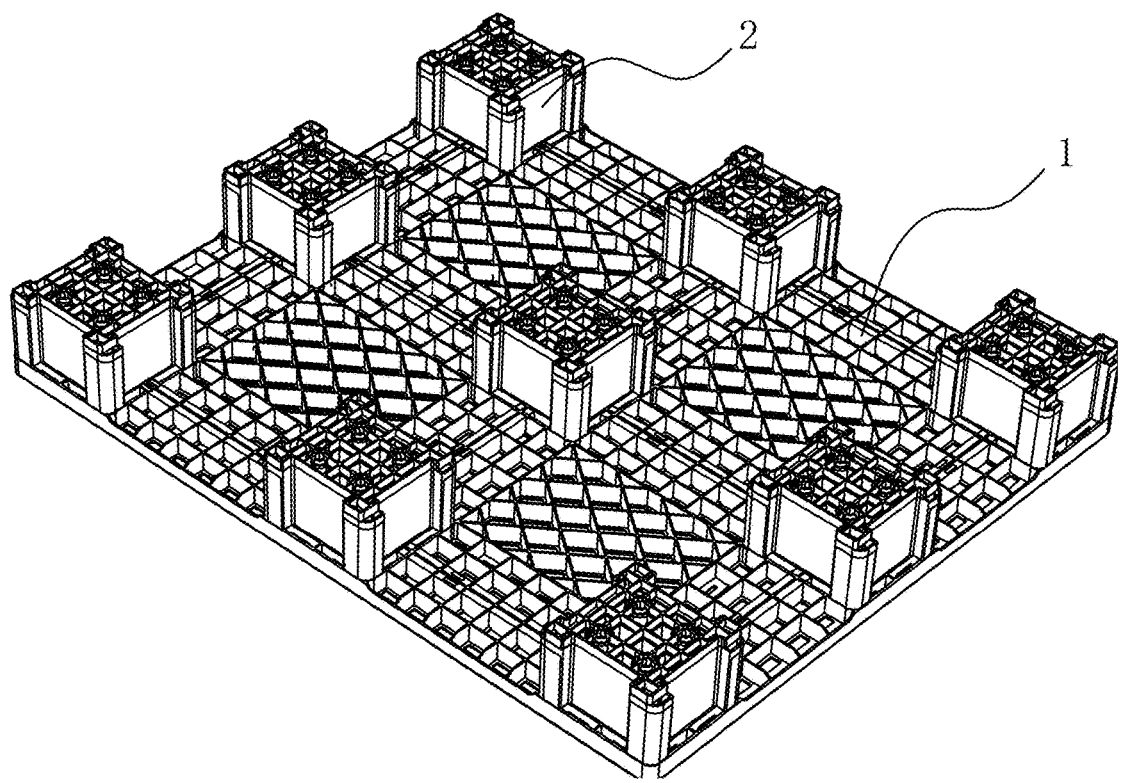
FIG. 6 is a schematic diagram of a bottom structure according to a fifth embodiment of the present disclosure.

The panel 1 is a rectangular panel, and the plastic pallet with four legs, five legs, six legs, eight legs and nine legs can be assembled with different number of support legs 2 mounted at a lower side of the panel 1 so as to meet storage requirements of different goods. For example, as shown in FIG. 3, when one support leg 2 is respectively provided at four corners of the panel 1, a four-legged plastic pallet can be assembled. As shown in FIG. 4, when one support leg 2 is respectively provided at four corners of the panel 1 and one support leg 2 is provided in a middle of the panel 1, a five-legged plastic pallet can be assembled. As shown in FIG. 5, when three support legs 2 are respectively provided on two long sides of the panel 1, a six-legged plastic pallet can be assembled. When one support leg 2 is respectively provided at the four corners and four sides of the panel 1, an eight-legged plastic pallet (not shown in the figures) can be assembled. As shown in FIG. 6, when one support leg 2 is respectively provided at four corners, four sides and the middle of the panel 1, a nine-legged plastic pallet can be assembled.

The metal reinforcement 3 is in a shape of a Chinese character "目", "田" or "口", and various different types of frames can better meet use requirements of the plastic pallet.

Figure 9:
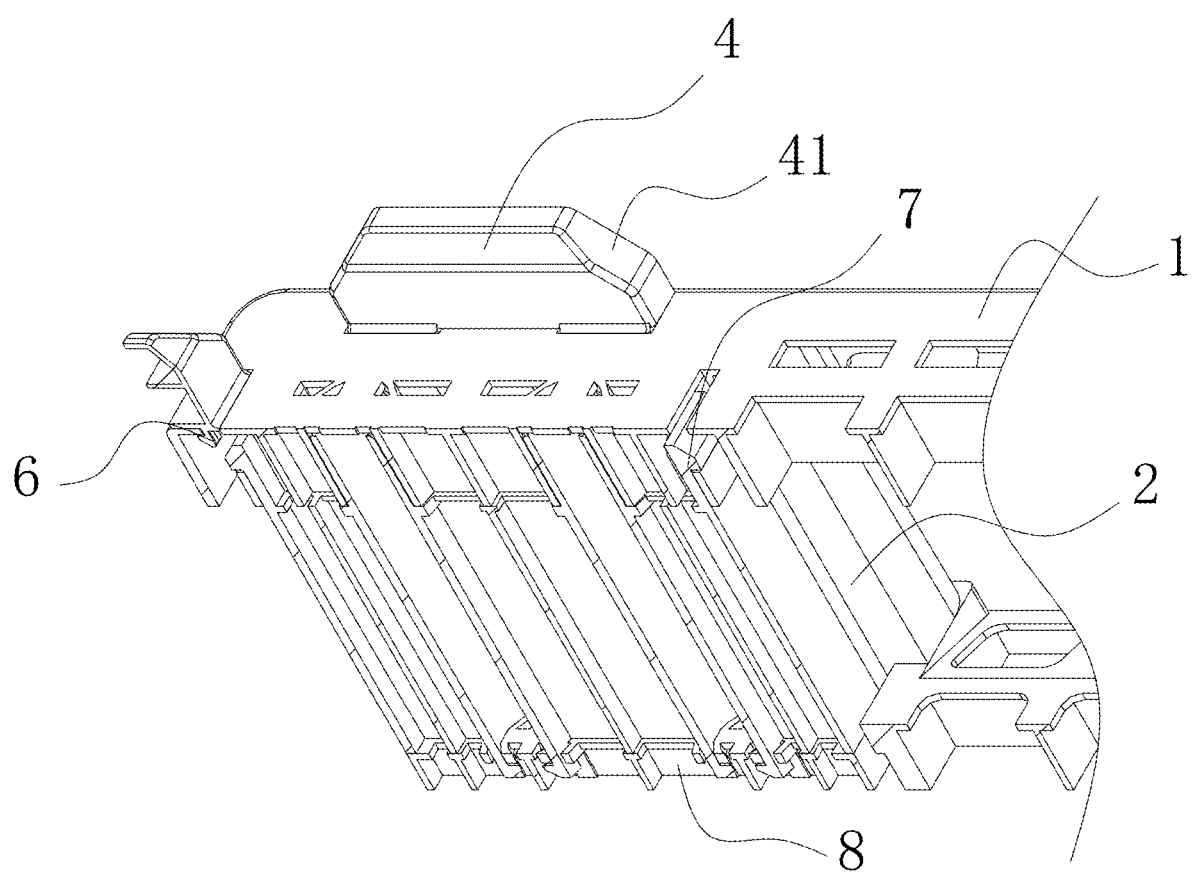
FIG. 9 is a schematic sectional view of an assembled structure of a panel, a support leg and a baffle according to the present disclosure.

In an embodiment, as shown in FIGS. 1 and 9, an edge of an upper side of the panel 1 is provided with a plurality of stoppers 4, and each of the plurality of stoppers 4 is arranged corresponding to the first groove 21. On the one hand, the stopper 4 is arranged at the edge of the panel 1 and protrudes from the panel 1, so that when goods are placed on the panel 1, the stopper 4 functions in limiting the goods, thus preventing the goods from slipping off during handling or tilting; On the other hand, when the plastic pallet is stacked, the stopper 4 can be inserted into the first groove 21, so that the stacked plastic pallets are stable and reliable in structure. Specifically, the stopper 4 has an introducing slope 41, so that the stopper 4 can be clamped into the first groove 21.

Figure 7:
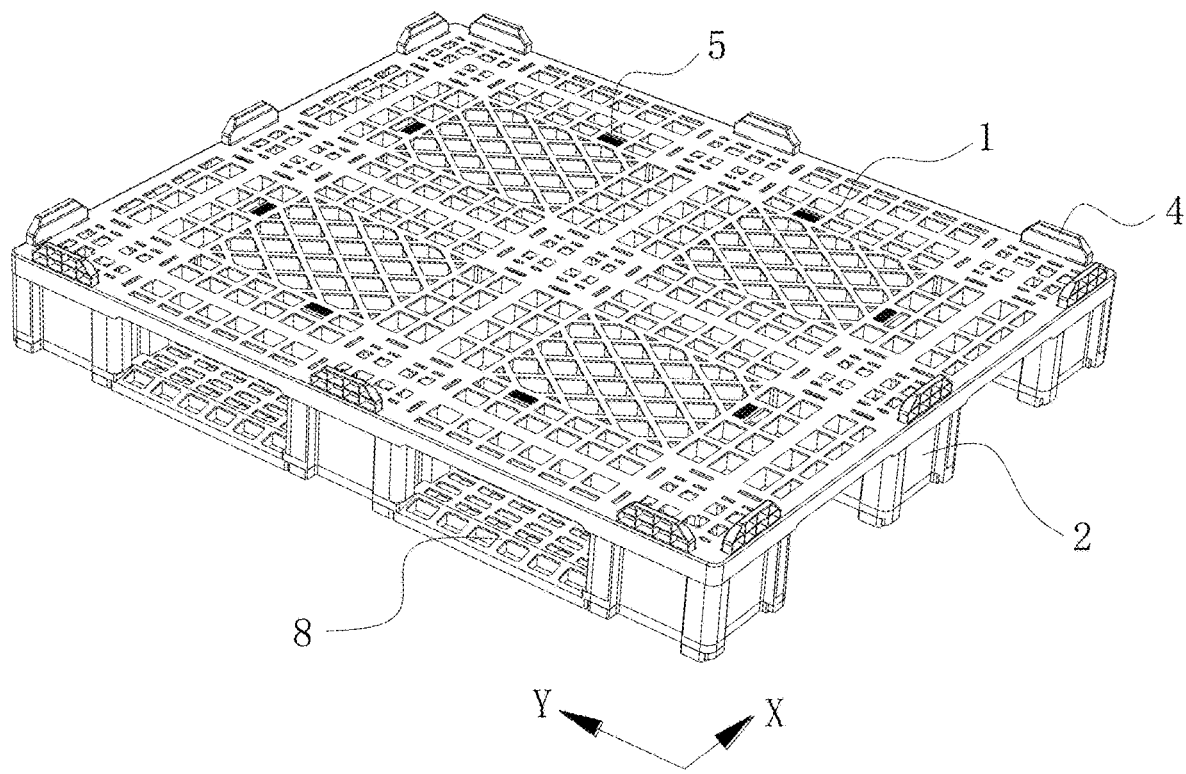
FIG. 7 is a schematic diagram of a bottom structure according to a sixth embodiment of the present disclosure.
Figure 13:
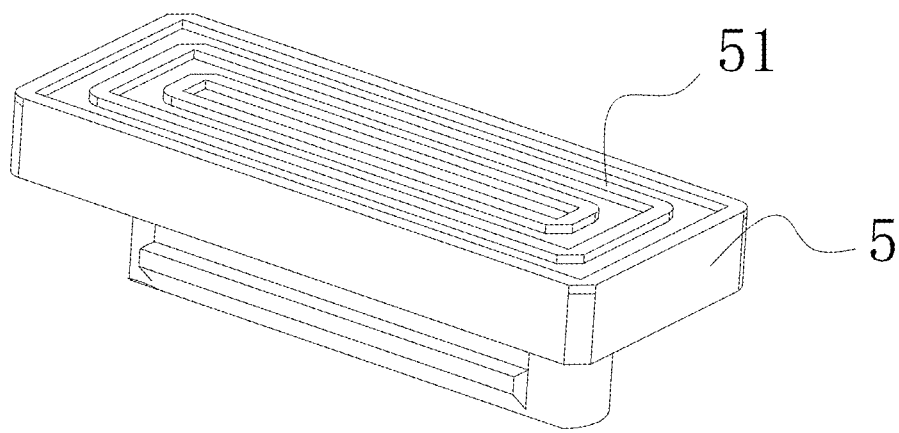
FIG. 13 is a schematic structural diagram of an antiskid block according to an embodiment of the present disclosure.

In an embodiment, as shown in FIGS. 1, 7 and 13, the upper side of the panel 1 is also provided with a plurality of antiskid blocks 5 which are provided with an antiskid ridge 51. The antiskid block 5 is arranged on the panel 1, which can increase friction resistance between the panel 1 and the goods, and prevent the goods from sliding during handling or tilting. Specifically, the antiskid ridge can be rectangular ring texture or rectangular texture with other structures, which provides antiskid effect on goods in four directions.

Figure 10:
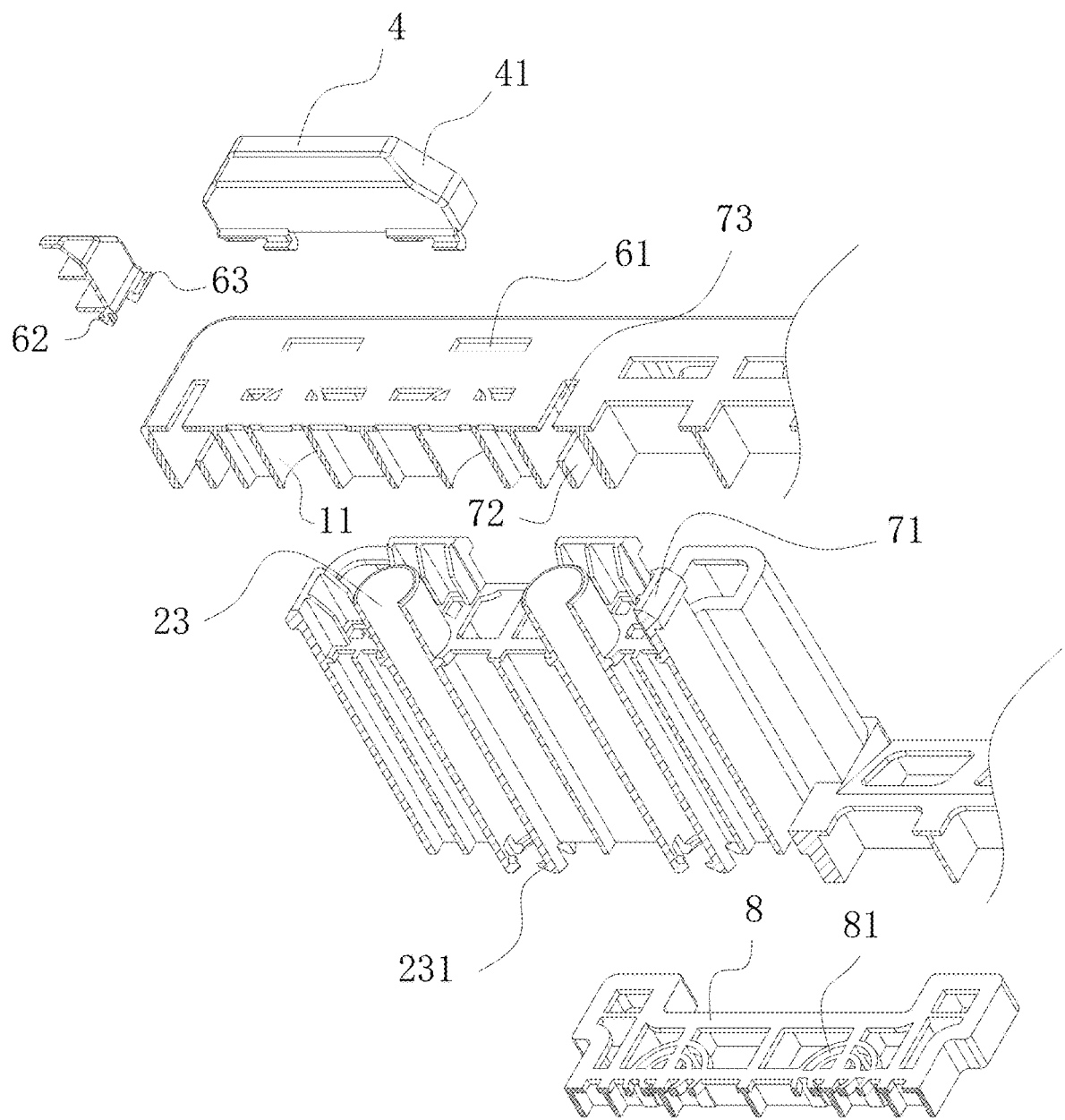
FIG. 10 is an exploded view of a structure in FIG. 9.

In an embodiment, as shown in FIGS. 9 and 10, the stopper 4 and the panel 1 are detachably connected with each other through a first clamping structure 6. The first clamping structure 6 includes a first clamping slot 61, a first clamping leg 62 and a second clamping leg 63. The first clamping leg 62 and the second clamping leg 63 are spaced apart from each other, and directions of the first clamping leg 62 and the second clamping leg 63 are disposed to be directed opposite to each other, and the first clamping leg 62 and the second clamping leg 63 extend into the first clamping slot 61 to be matched and clamped. The directions of the first clamping leg 62 and the second clamping leg 63 are directed opposite to each other, so that when the stopper 4 and the antiskid block 5 are clamped in the first clamping slot 61 of the panel 1, both sides can be well clamped, with a stable structure, and both the stopper 4 and the antiskid block 5 do not shake. In addition, the first clamping leg 62 and the second clamping leg 63 are spaced apart from each other, so that the first clamping leg 62 and the second clamping leg 63 have a relatively large elastic deformation space and do not interfere with each other. The first clamping leg 62 and the second clamping leg 63 are both provided with a slope for assisting in clamping in the first clamping slot 61 and a step for clamping with a wall of the first clamping slot 61.

The antiskid block 5 and the panel 1 can also be connected with each other with the first clamping structure 6.

Specifically, the first clamping leg 62 and the second clamping leg 63 can be arranged on the stopper 4 and the antiskid block 5, and the first clamping slot 61 is arranged on the panel 1. However, it is not limited to this, the first clamping leg 62 and the second clamping leg 63 can also be arranged on the panel 1, and the first clamping slot 61 is arranged on the support leg 2, which can realize clamping connection between the panel 1, the stopper 4 and the antiskid block 5, which is not limited in the present disclosure.

Figure 2:
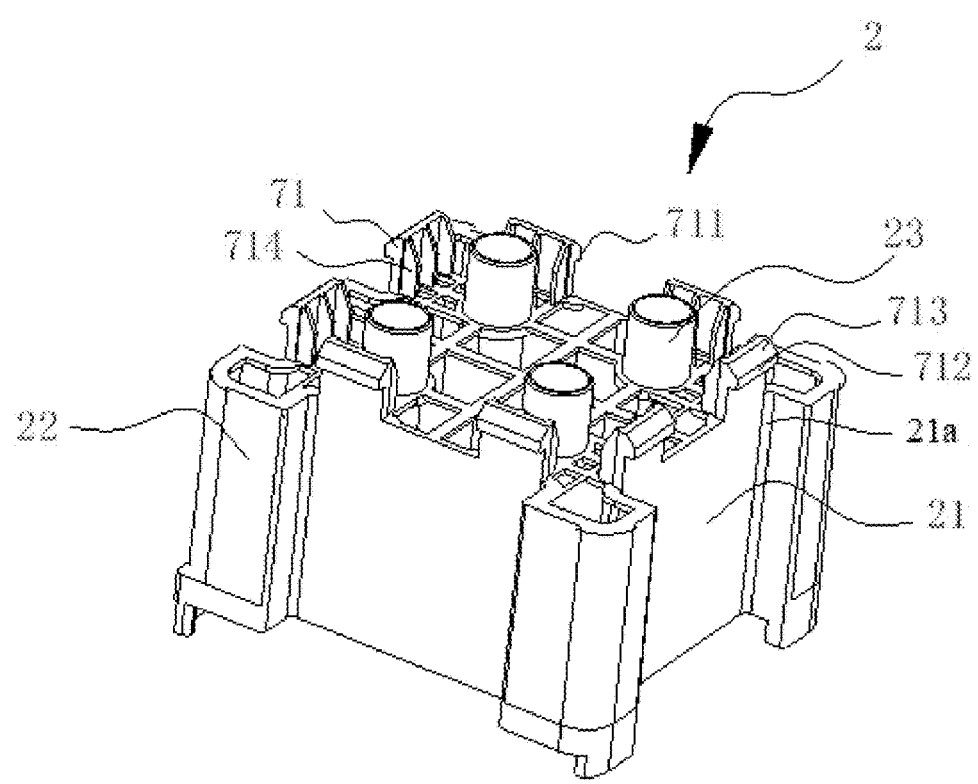
FIG. 2 is a schematic structural diagram of a support leg according to an embodiment of the present disclosure.

In an embodiment, as shown in FIGS. 2, 9 and 10, the panel 1 and the support leg 2 are detachably connected with each other through a second clamping structure 7. The second clamping structure 7 includes a third clamping leg 71, a clamping post 72 and a second clamping slot 73. The third clamping leg 71 is provided with a clamping step 711 and a clamping head 712, and the clamping step 711 is matched with the clamping post 72 for limiting. The clamping head 712 has a clamping slope 713, and a part of the clamping head 712 is inserted into the second clamping slot 73, so that a limiting structure can be formed between the third clamping leg 71 and the second clamping slot 73 in a horizontal direction. The clamping slope 713 provided in the clamping head 712 makes the clamping head 712 not fully extend into the second clamping slot 73; and with the limiting structure of the clamping step 711 and the clamping post 72, a limiting structure can be formed in a vertical direction, thus ensuring a stable second clamping structure 7 formed between the panel 1 and the support leg 2. Meanwhile, the clamping slope 713 is designed so that the third clamping leg 71 can be clamped more smoothly. A reinforcing bar 714 can be provided at a back of the third clamping leg 71, so that the third clamping leg 71 has high structural strength, and the slope on the reinforcing rib 714 can be designed so that a depth of the third clamping leg 71 extending into the second clamping slot 73 can be limited. Specifically, the third clamping leg 71 can be arranged on the support leg 2, and the clamping post 72 and the second clamping slot 73 are arranged on the panel 1 corresponding to the third clamping leg 71. However, it is not limited to this, the third clamping leg 71 can also be arranged on the panel 1, and the clamping post 72 and the second clamping slot 73 are arranged on the support leg 2 corresponding to the third clamping leg 71, which can realize clamping connection between the panel 1 and the support leg 2, which is not limited in the present disclosure.

Figure 8:
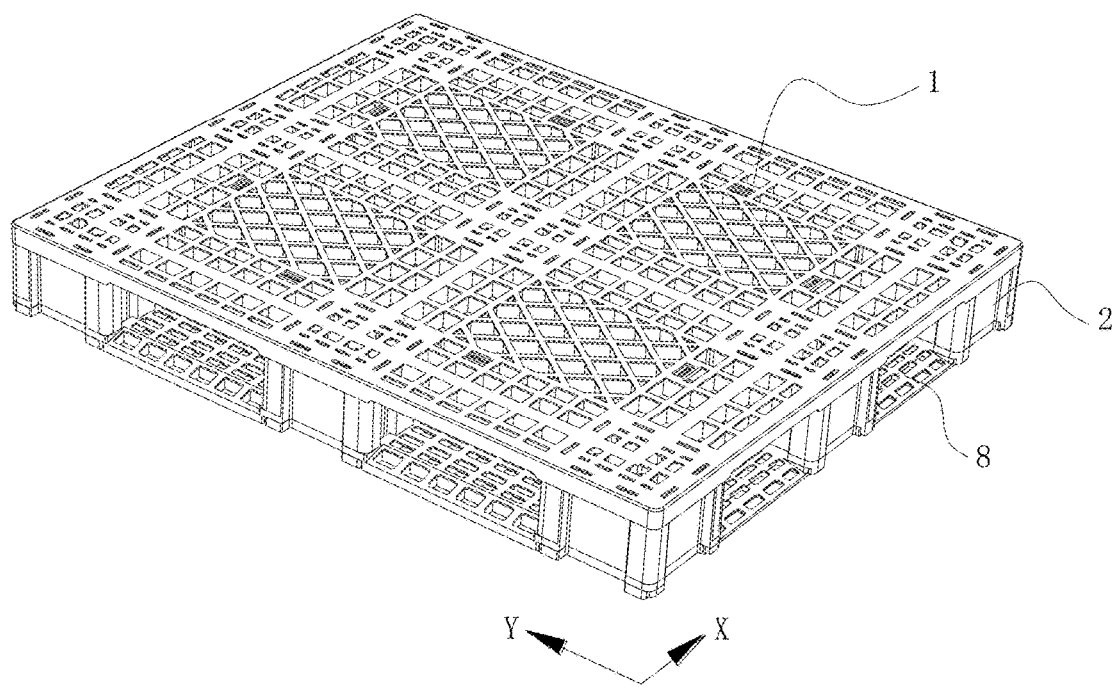
FIG. 8 is a schematic diagram of a bottom structure according to a seventh embodiment of the present disclosure.

In an embodiment, as shown in FIGS. 7 and 8, the assembled plastic pallet further includes a plurality of bottom deckboards 8. The plurality of support legs 2 are arranged in rows along a first horizontal direction X and a second horizontal direction Y, and the plurality of bottom deckboards 8 are detachably arranged at a bottom of the support legs 2 along the first horizontal direction X and/or the second horizontal direction Y.

Figure 16:
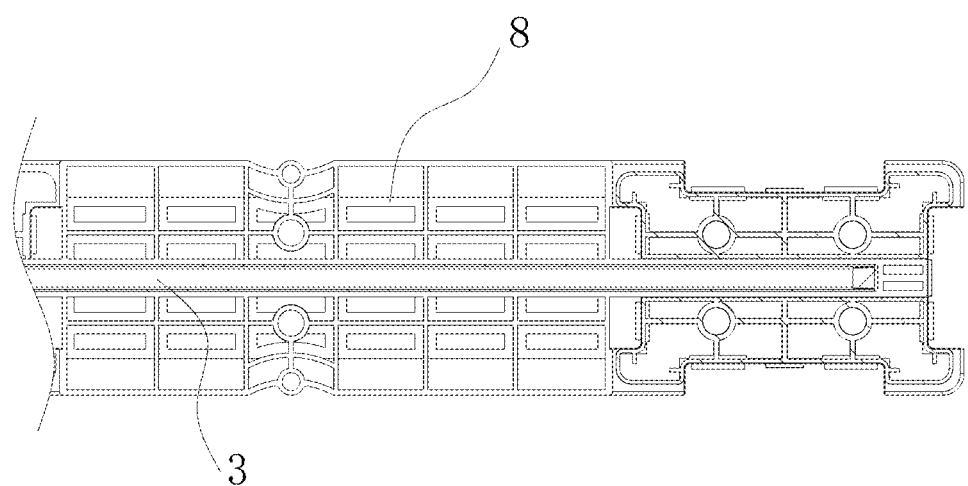
FIG. 16 is a partial sectional view of a bottom deckboard according to an embodiment of the disclosure.

As shown in FIG. 16, a metal reinforcement 3 is embedded in the plurality of bottom deckboards 8 so as to increase structural strength of the plurality of bottom deckboards 8, so that structures of the bottom deckboards are firm when being put on a shelf. The metal reinforcement 3 is a steel tube, and the steel tube is arranged along a length direction of the bottom deckboard 8. An edge of the bottom deckboard 8 is also provided with combination of an arc groove and a round hole so as to prevent stress concentration of the bottom deckboard 8 after injection molding.

Specifically, a number of the support legs 2 can be nine, and the nine support legs 2 are arranged in a 3x3 structure. As shown in FIG. 7, when all of the bottom deckboards 8 are arranged along the first horizontal direction or along the second horizontal direction, they can form a plastic pallet with a shape of a Chinese character "川". As shown in FIG. 8, when all of the bottom deckboards 8 are arranged in the first horizontal direction and the second horizontal direction, they can form a plastic pallet with a shape of a Chinese character "田".

Figure 17:
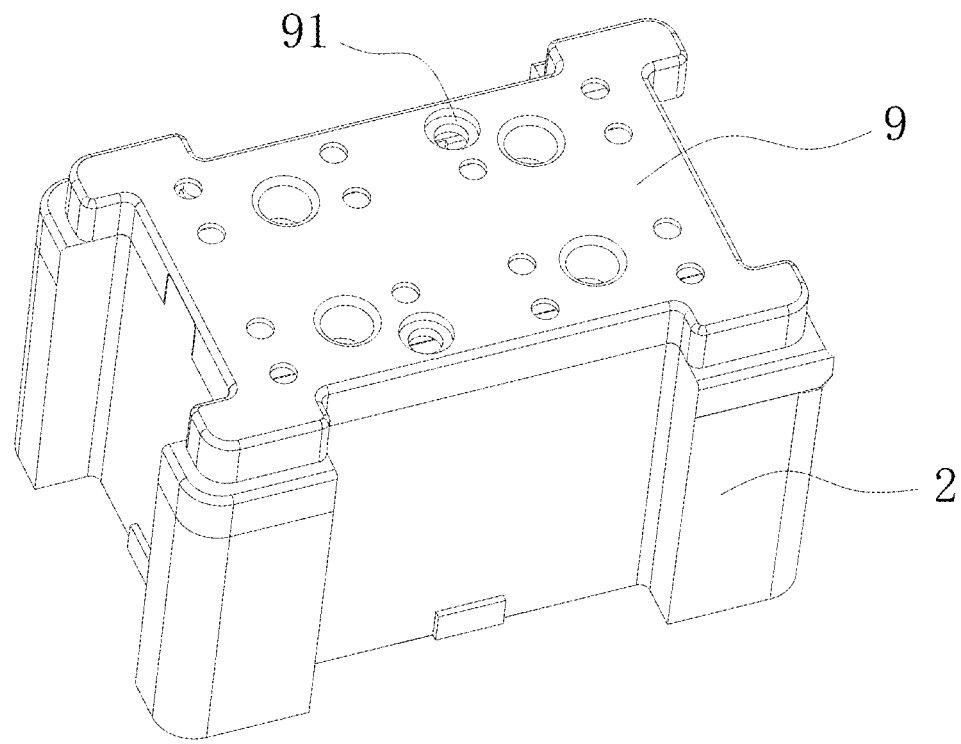
FIG. 17 is a schematic diagram of a bottom surface of a baseboard according to an embodiment of the present disclosure.

However, it is not limited to this, as shown in FIGS. 5 and 6, the bottom of the support leg 2 can also be provided with only the baseboard 9 conformed to its bottom shape, so that the support leg 2 can be adjusted into a single leg or a structure with a shape of a Chinese character "川" or "田" as desired, and different combinations among the support leg 2, the baseboard 9 and the bottom deckboard 8 can involve all of required non-nested types of pallet. As shown in FIG. 17, a bottom surface of the baseboard 9 is provided with a mounting hole 91 for mounting an antislip pad. If the antiskid pad is made of a soft material such as silica gel or rubber, it can increase friction between the baseboard 9 and the ground or between the baseboard 9 and the panel 1 in contact with the baseboard when stacked.

Both sides of the bottom deckboard 8 have an inclined surface downward toward the ground, so that forklifts can be inserted.

In an embodiment, as shown FIGS. 9 and 10, the bottom of the support leg 2 is provided with a clamping column 23 with a circular cross section. The clamping column 23 is provided with a plurality of fourth clamping legs 231 distributed along its circumferential direction, each of the plurality of bottom deckboards 8 is provided with a plurality of clamping slots 81 corresponding to the fourth clamping legs 231, and the fourth clamping legs 231 are matched and clamped with the clamping slots 81. The fourth clamping legs 231 and the clamping slots 81 are all arc-shaped, and all of the fourth clamping legs 231 enclose a circular structure, and a structure in which all of the fourth clamping legs 231 and their corresponding clamping slots 81 matched and clamped with each other is stable and is not easy to shake. Orientations of all of the fourth clamping legs 231 can be the same or different, which is not specifically limited in this disclosure.

The clamping column 23 can be arranged through the support leg 2, that is, both ends of the support legs 2 can be provided with the clamping column 23. A positioning cylinder 11 is provided on the panel 1, and the clamping column 23 at an upper end of the support leg 2 are sleeved or inserted into the positioning cylinder 11 of the panel 1, and the clamping column 23 at a lower end of the support leg 2 is matched and clamped with the bottom deckboard 8.

Figure 18:
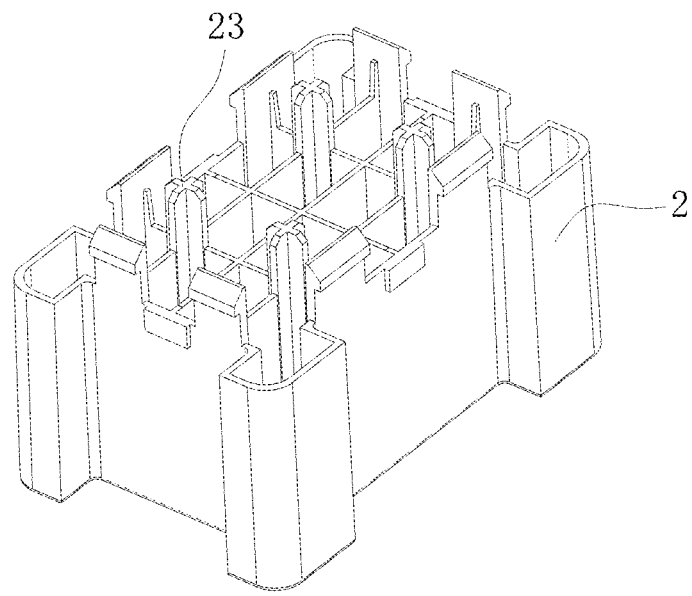
FIG. 18 is another structural diagram of a support leg according to the present disclosure.

However, it is not limited to this, as shown in FIG. 18, a cross section of the clamping column 23 can also be of a crossed structure with a cruciform shape or a X shape, and the cruciform-shaped or X-shaped clamping column 23 is inserted into the positioning cylinder 11 of the panel 1. A size of the clamping column 23 is slightly larger than an inner diameter of the positioning cylinder 11, and an assembled structure between the clamping column 23 and the positioning cylinder 11 is stable. Because a contact area between the clamping column 23 and the panel 1 is small, it is easier to insert the clamping column 23. An insertion end of the clamping column 23 is provided with an introducing surface, so that the clamping column 23 can be smoothly inserted into the positioning cylinder 11.

In addition, the support leg 2 and the baseboard 9 can be detachably connected with each other with the fourth clamping leg 231 and the clamping slot 81.

Figure 11:
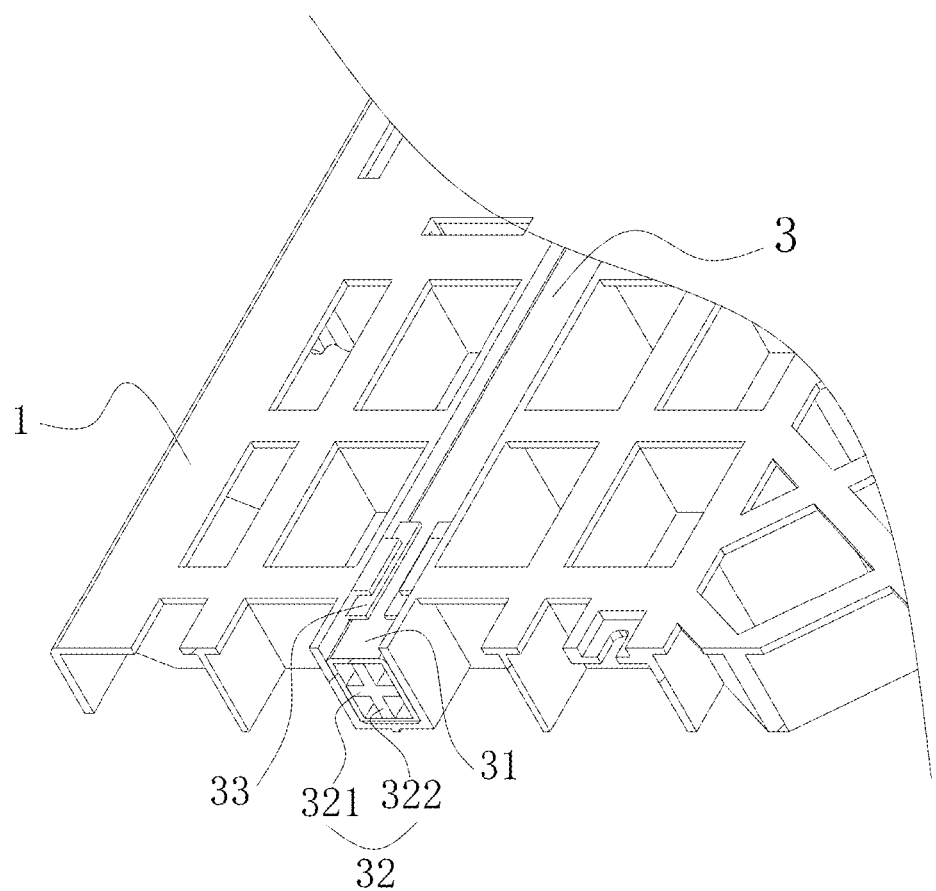
FIG. 11 is a schematic sectional view of a metal reinforcement embedded in the panel according to an embodiment of the present disclosure.
Figure 12:
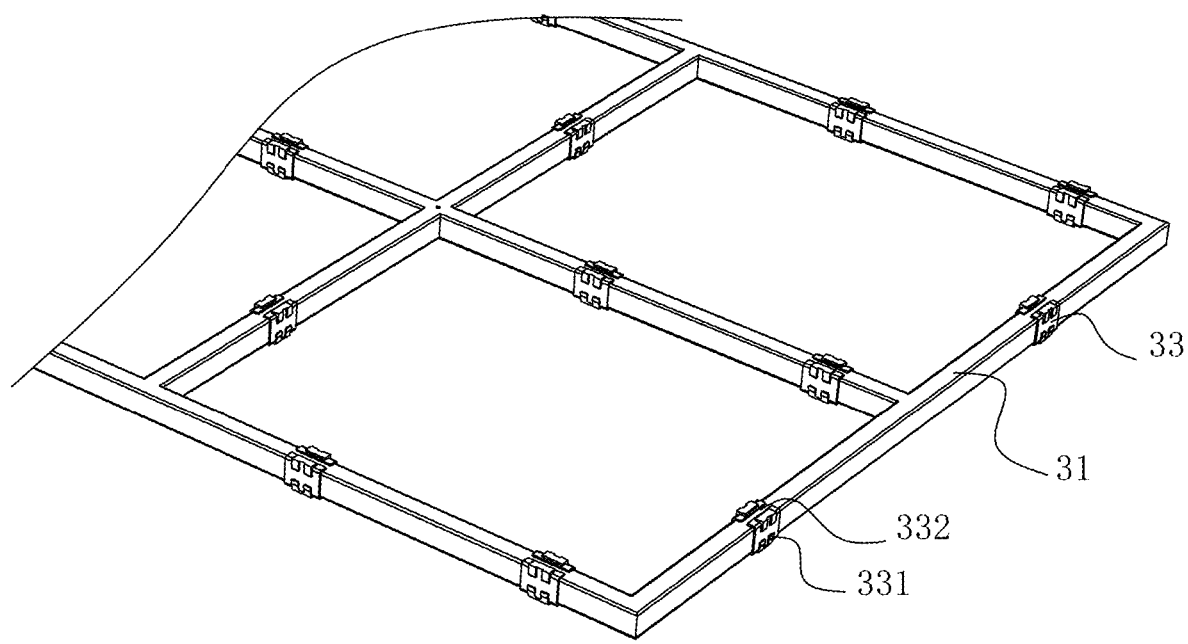
FIG. 12 is a structural diagram of a metal reinforcement according to an embodiment of the present disclosure.

In an embodiment, as shown in FIGS. 11 and 12, the metal reinforcement 3 includes a tubular metal reinforcement tube 31 and a support 32 embedded in the metal reinforcement tube 31, and a side of the support 32 abuts against an inner wall of the metal reinforcement tube 31. The metal reinforcement tube 31 is hollow in shape, which can greatly reduce weight, save materials and cost while maintaining strength and rigidity of a main reinforcing frame.

A cross section of the metal reinforcement tube 31 is rectangular, and the support 32 includes at least one first support part 321 and at least one second support part 322. The first support part 321 and the second support part 322 are arranged perpendicular to each other, so that the cross section of the support 32 has a shape of a Chinese character "卄", a shape of a cruciform or shape of a Chinese character "井", which can prevent the hollow metal reinforcement tube 31 from being extruded and deformed under an injection pressure. The support 32 is embedded in the metal reinforcement tube 31 so as to enhance strength and rigidity of the metal reinforcement 3 without significantly increasing weight of the metal reinforcement 3.

The metal reinforcement tube 31 is sleeved with a plurality of positioning fasteners 33, and an outer side surface of each of the positioning fasteners 33 protrudes outwards to form a positioning part 331. The positioning fastener 33 is preferably sleeved on the main reinforcing frame in a manner of a buckle, which is simple in structure and convenient to install, and other detachable connection modes such as bolts can also be adopted. The positioning fastener 33 is preferably made of plastic.

Before injection molding when plastic products are manufactured, the metal reinforcement 3 is firstly implanted at a reserved position of the mold, and the positioning fastener 33 is buckled to a corresponding buckling position in the mold, so that the metal reinforcement 3 is fixed relative to the mold, so as to prevent dislocation of the metal reinforcement 3 relative to the mold in subsequent mold movement and injection molding. Moreover, the positioning fastener 33 can divide the plastic wrapping the metal reinforcement 3 into segments during the injection molding, so that the wrapped plastic is prevented from being broken and fractured by the metal reinforcement 3 when it shrinks after injection molding. The metal reinforcement 3 is simultaneously implanted during the injection molding of the panel 1, and the metal reinforcement 3 can be completely covered by the plastic during the injection molding, so that the panel 1 has better integrity and high structural strength.

A fractured groove 332 is defined at a side of the positioning fastener 33, so that the positioning fastener 33 can be directly buckled into a middle part of the metal reinforcement tube 31, which is more convenient to use.

Figure 14:
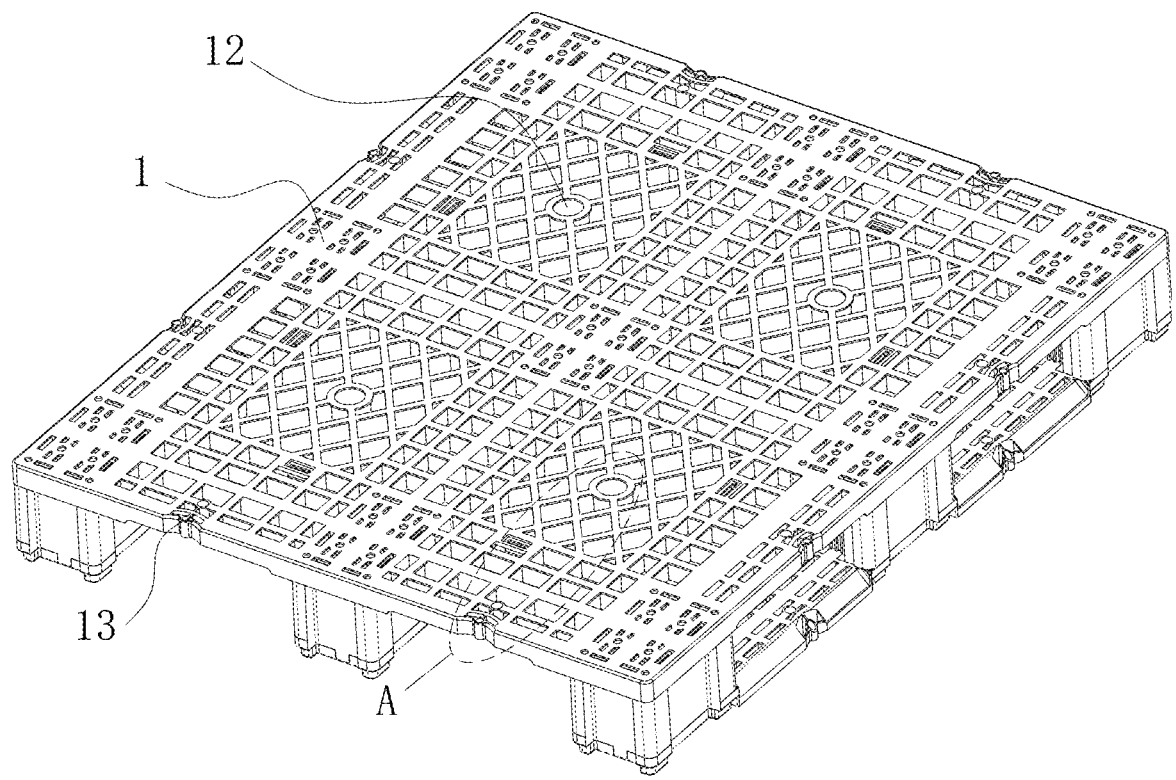
FIG. 14 is a schematic structural diagram of a panel according to an eighth embodiment of the present disclosure.
Figure 15:
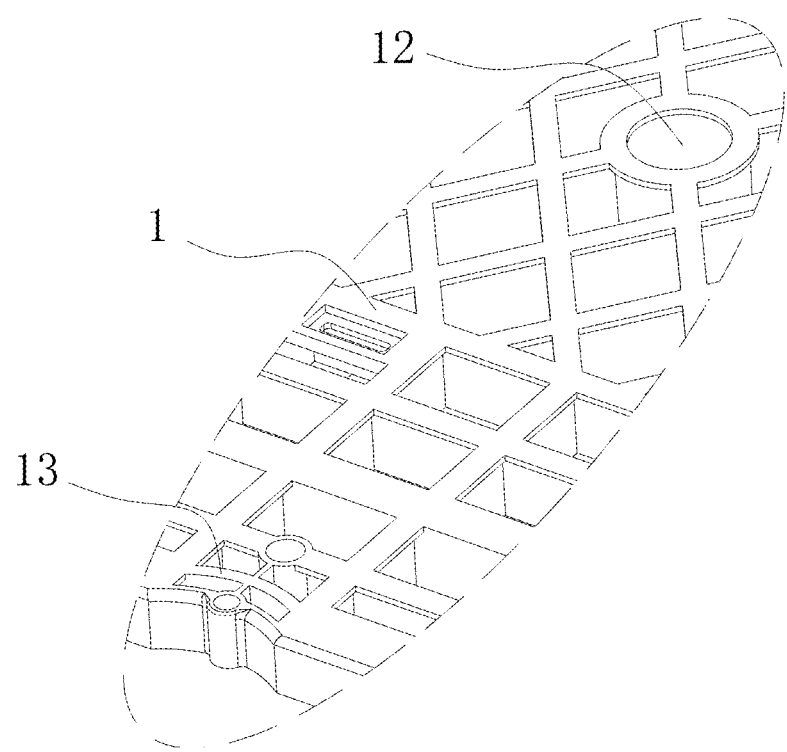
FIG. 15 is a partial enlarged view at A in FIG. 14.

As shown in FIGS. 14 and 15, in an embodiment, the panel 1 is provided with a round hole 12, and an edge of the panel 1 is provided with combination of an arc groove 13 and a round hole so as to prevent stress concentration of the panel 1 after injection molding. The panel 1 has a rectangular structure, two arc grooves 13 are uniformly arranged on four sides of the panel 1, and four round holes 12 are uniformly arranged in the panel 1, so that the stress is uniform.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

The invention claimed is:

1. An assembled plastic pallet, comprising
a panel;
a plurality of support legs detachably arranged at a lower side of the panel, wherein a first metal reinforcement is embedded in the panel, each of the plurality of support legs is in a cuboid, four sides of each of the plurality of support legs is recessed inward to form a first groove, four sides of each of the plurality of support legs is formed with a reinforcing rib, and the reinforcing rib is transitioned to a bottom of the first groove with an arc;
a plurality of bottom deckboards, wherein the plurality of support legs are arranged in rows along a first horizontal direction and a second horizontal direction, and the plurality of bottom deckboards are detachably arranged at a bottom of the support legs along the first horizontal direction and/or the second horizontal direction; and
a second metal reinforcement is embedded in the plurality of bottom deckboards;
wherein the bottom of the support leg is provided with a clamping column with a circular cross section, the clamping column is provided with a plurality of fourth clamping legs distributed along its circumferential direction, each of the plurality of bottom deckboards is provided with a plurality of clamping slots corresponding to the fourth clamping legs, and the fourth clamping legs are matched and clamped with the clamping slots.

2. The assembled plastic pallet according to claim 1, wherein an edge of an upper side of the panel is provided with a plurality of stoppers, and each of the plurality of stoppers is arranged corresponding to one of the first grooves.

3. The assembled plastic pallet according to claim 2, wherein the upper side of the panel is further provided with a plurality of antiskid blocks which are provided with an antiskid ridge; and a stress relief area is provided on the panel and/or at an edge of the panel.

4. The assembled plastic pallet according to claim 3, wherein the stopper and the panel are detachably connected with each other through a first clamping structure, wherein the first clamping structure comprises a first clamping slot, a first clamping leg and a second clamping leg, the first clamping leg and the second clamping leg being spaced apart from each other, and directions of the first clamping leg and the second clamping leg being disposed to be directed opposite to each other, and the first clamping leg and the second clamping leg extending into the first clamping slot to be matched and clamped.

5. The assembled plastic pallet according to claim 1, wherein the panel and the support leg are detachably connected with each other through a second clamping structure, wherein the second clamping structure comprises a third clamping leg, a clamping post and a second clamping slot, the third clamping leg being provided with a clamping step and a clamping head, and the clamping step being matched with the clamping post for limiting, The clamping head having a clamping slope, and a part of the clamping head being inserted into the second clamping slot.

6. The assembled plastic pallet according to claim 1, wherein the second metal reinforcement comprises a tubular metal reinforcement tube and a support embedded in the metal reinforcement tube, a side of the support abutting against an inner wall of the metal reinforcement tube.

7. The assembled plastic pallet according to claim 6, wherein a cross section of the metal reinforcement tube is rectangular, and the support comprises at least one first support part and at least one second support part, the first support part and the second support part being arranged perpendicular to each other.

8. The assembled plastic pallet according to claim 6, wherein the metal reinforcement tube is sleeved with a plurality of positioning fasteners, an outer side surface of each of the positioning fasteners protruding outwards to form a positioning part.

\* \* \* \* \*